United States Patent [19]

Simon et al.

[11] Patent Number: 4,549,712

[45] Date of Patent: Oct. 29, 1985

[54] APPARATUS FOR MOUNTING A DEVICE ON A SLOTTED POST

[75] Inventors: Virgil S. Simon, Glenview; Arthur C. Gutowsky, Buffalo Grove; Nestor T. Haluzak, Morton Grove, all of Ill.

[73] Assignee: Thomas A. Schutz Co., Inc., Morton Grove, Ill.

[21] Appl. No.: 384,016

[22] Filed: Jun. 1, 1982

[51] Int. Cl.[4] .......... F16M 13/00
[52] U.S. Cl. .......... 248/224.4
[58] Field of Search .......... 248/73, 222.2, 224.4, 248/239, 242, 243, 265, 269, 270, 295.1, 466, 201

[56] References Cited

U.S. PATENT DOCUMENTS

| | | | |
|---|---|---|---|
| 570,657 | 11/1896 | Beckwith | 248/243 X |
| 1,917,917 | 7/1933 | Bales | 248/243 X |
| 1,952,111 | 3/1934 | Bales | 248/243 X |
| 2,398,219 | 4/1946 | Geer | 248/251 X |
| 2,678,793 | 5/1954 | Brochstein | 248/243 |
| 2,741,449 | 4/1956 | Heselov | 248/243 |
| 2,772,846 | 12/1956 | Skar | 248/243 |
| 3,495,718 | 12/1967 | Romero . | |
| 3,684,228 | 8/1972 | Sobel | 248/224.4 X |
| 4,140,294 | 2/1979 | Zwarts | 248/270 X |
| 4,179,091 | 12/1979 | Bidney | 248/295.1 X |

FOREIGN PATENT DOCUMENTS

| | | | |
|---|---|---|---|
| 45159 | 2/1974 | Australia | 248/243 |
| 307258 | 3/1929 | United Kingdom | 248/243 |

OTHER PUBLICATIONS

Sketch of "Universal" mounting keys described on pp. 1-2 of present application; Virgil S. Simon; 4/13/82.

*Primary Examiner*—William H. Schultz
*Attorney, Agent, or Firm*—Wood, Dalton, Phillips, Mason & Rowe

[57] ABSTRACT

Apparatus for mounting display devices on retail store modular shelving of the type that has hollow steel upright supporting posts each having a line of spaced longitudinal slots; with posts of laterally adjacent modules abutting one another or with adjacent modules hung on a single post. The mounting apparatus has a pair of fittings which engage vertically spaced post slots, a bracket which has an upright mounting arm is fastened to the fittings by two screws and has a display device supporting arm at right angles to the mounting arm, and a leveling screw goes through a threaded hole near the bottom of the mounting arm so as to bear against the post for leveling the bracket and fixing it firmly relative to the post. The fittings are constructed so two of them may be placed in coplanar slots of abutting posts in order to mount abutting display devices on laterally adjacent modules.

7 Claims, 7 Drawing Figures

APPARATUS FOR MOUNTING A DEVICE ON A SLOTTED POST

BACKGROUND OF THE INVENTION

It is often desirable to mount point-of-purchase display devices on the modular shelving that is used in retail stores. The commonest types of such shelving have hollow steel upright supporting posts at each end of each module, and each supporting post has a line of spaced longitudinal slots in which mounting hooks for the merchandise supporting shelves are engaged. In most cases, the posts of laterally adjacent modules abut one another; although there are certain types of shelving in which a single post supports two adjacent modules.

Various manufacturers of modular shelving use supporting posts of different cross sectional configurations and areas, and the slots in the posts of different manufacturers' shelving are of different lengths and different spacings. Apparatus for mounting point-of-purchase display devices on such modular shelving must be capable of being mounted on the supporting posts of any of the several types of shelving used in retail stores, in order that the company placing the display devices need not have different mounting brackets for each different kind of shelving.

There is one company which markets a "universal" mounting key which is sufficiently universal that only two types of such mounting keys are required to fit many of the slotted hollow steel posts now on the market. Each mounting key is fabricated from a piece of 3/32" (2.38 mm) sheet metal which may be inserted edgewise through a post slot. The key includes a shank which is threaded top and bottom to receive a wing nut, and at one end of the shank are ears which engage the interior of a post above and below a post slot through which the key is inserted. The wing nut may be screwed into firm clamping engagement with the post wall, or with a bracket which is supported upon the shank and clamped against the post wall by the wing nut.

The above-described mounting keys have proved to be satisfactory for connecting supporting brackets to the upright hollow posts of retail shelving. However, the wing nuts which are used on such mounting keys must be of fairly large diameter to function properly, and the span across the wings must be large enough that two such keys may not be used in coplanar slots of the laterally abutting posts of two adjacent modules because the wind nuts interfere with one another; nor, of course, may they be used in a single slot of a post that supports two modules.

There are certain situations in which it is desirable to have several point-of-purchase display devices placed end-to-end above adjacent modules, and there is no way that the above-described mounting keys can be used for this purpose.

SUMMARY OF THE INVENTION

In accordance with the present invention, a fitting has a postengaging element of a shape and thickness to be inserted edgewise through a post slot, and the element includes a neck adapted to rest on the bottom of a post slot into which it is inserted, and ears in the plane of the neck to engage the interior of the post above and below the post slot to retain the inserted fitting loosely on the post. There is an integral web at right angles to the neck which extends transversely of a post in which the post-engaging element is inserted, and the web is constructed to avoid interference with a separate fitting inserted in a coplanar slot of a second post that is in laterally abutting relationship to the post in which the fitting is inserted. The post-engaging elements are thin enough that where a single post supports two modules, two of the elements may be positioned side-by-side in one slot. The web has a fastener hole to receive a fastener for securing a bracket to the web.

A pair of such fittings may be pre-engaged in an upper post slot and a lower post slot, and the apparatus includes a bracket comprising an upright mounting arm. The mounting arm has a hole adapted to receive a fastener which also extends into a fastener hole of the web of one of the pair of fittings, and also has a longitudinal slot to receive a fastener which extends into the fastener hole of the web of the other of the pair of fittings. Leveling means is adapted to engage the bracket mounting arm and the post for putting the mounting arm in plumb and holding it firmly against the post.

In a most preferred embodiment of the invention, the fitting includes a side web which is perpendicular to the integral web and an outer web parallel to the integral web so as to define a laterally open channel, and the outer web has a fastener hole aligned with the fastener hole in the integral web. The bracket mounting arm is a channel which nests in the laterally open channels of the two fittings, and at the top of the mounting arm is a channel shaped support arm which is at right angles to the mounting arm. The fastener holes in the integral webs of the fittings are threaded and the fasteners are threaded to screw into the fastener holes, and the leveling means includes a threaded leveling bolt hole near the lower end of the bracket mounting arm and a threaded bolt which is adapted to be screwed through the leveling bolt hole and thereupon the posts so as to rock the bracket about the upper fitting relative to the post.

THE DRAWINGS

DETAILED DESCRIPTION OF THE INVENTION

Figure 1:
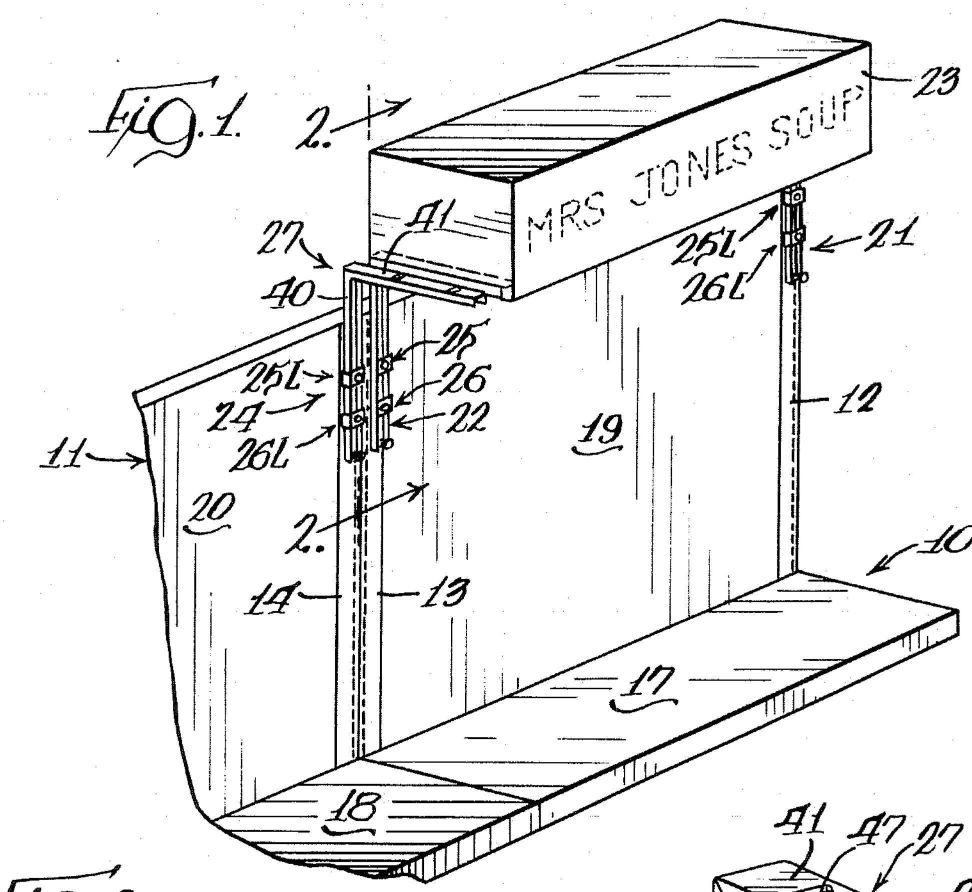
FIG. 1 is a fragmentary perspective view of two adjacent sections of modular retail store shelving with the apparatus of the present invention mounted thereon and a typical point-of-purchase display device supported on the apparatus.
Figure 2:
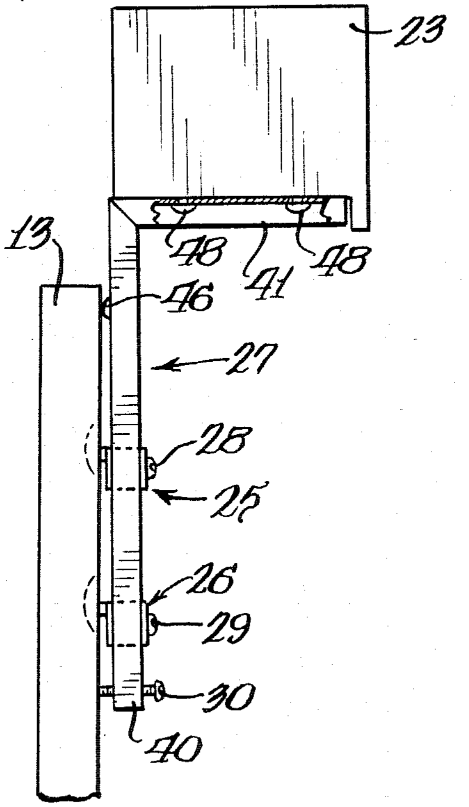
FIG. 2 is a fragmentary sectional view on an enlarged scale, with a part broken away, taken substantially as indicated along the line 2—2 of FIG. 1.
Figure 3:
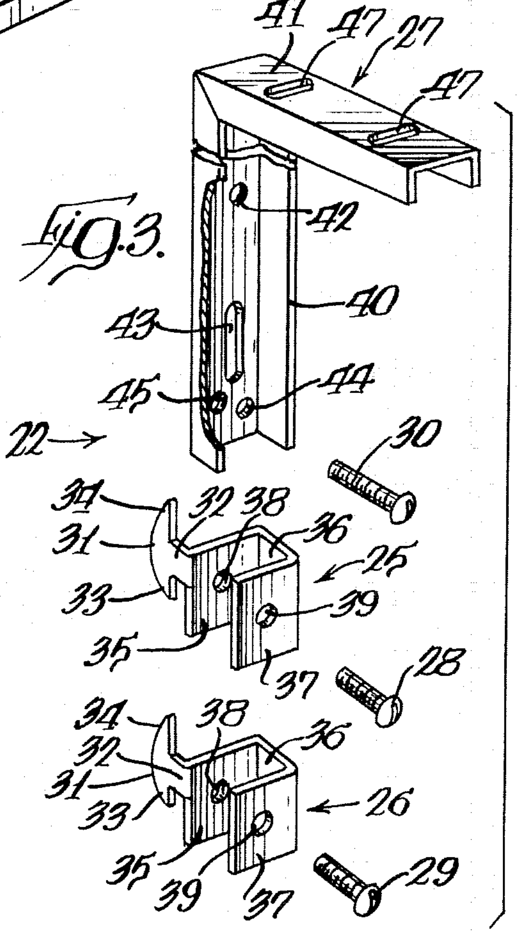
FIG. 3 is an exploded perspective view of the elements of the apparatus with a part broken away.
Figure 4:
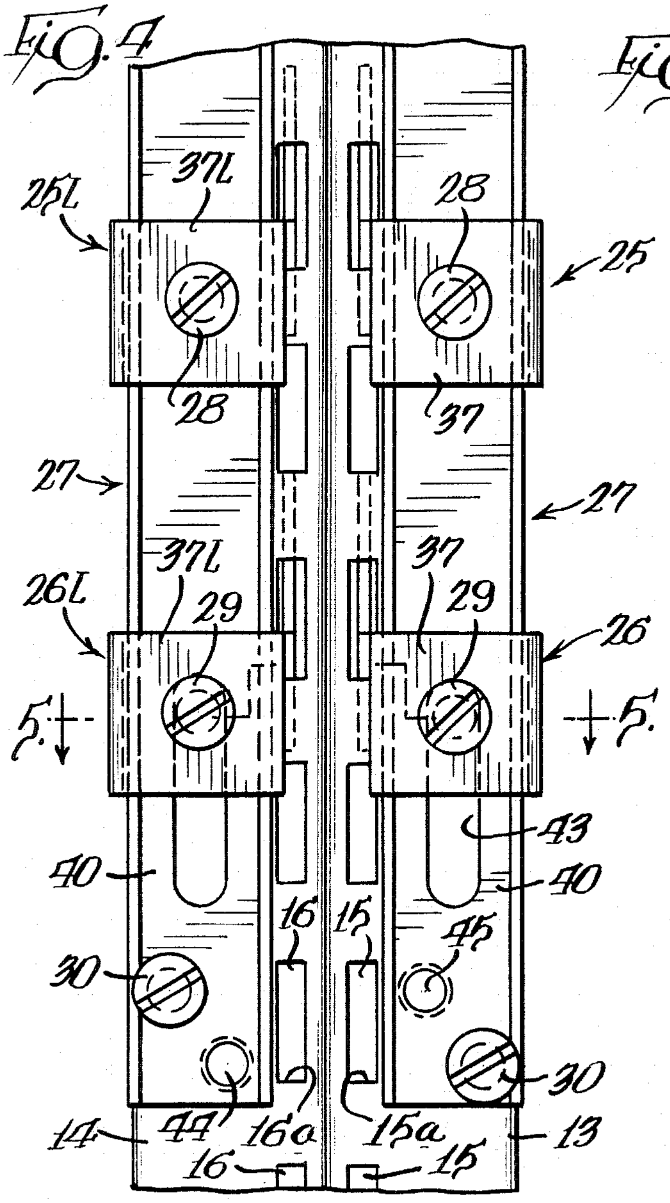
FIG. 4 is a fragmentary front elevational view of the apparatus illustrated in the left hand part of FIG. 1.
Figure 5:
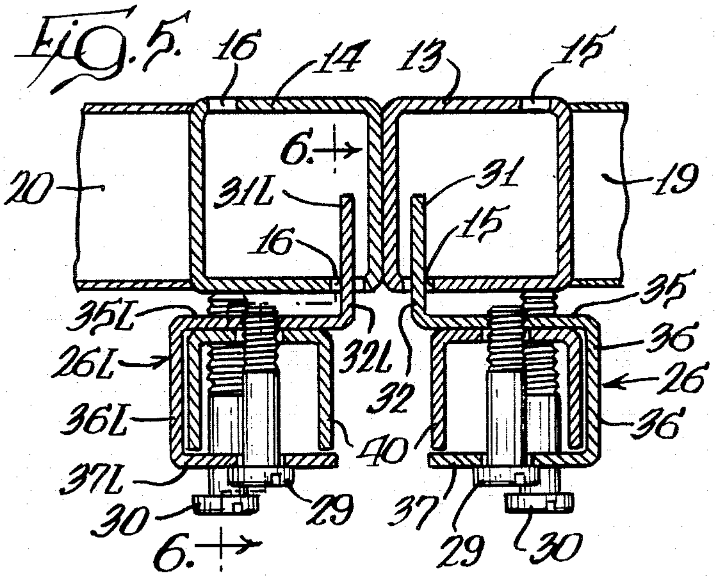
FIG. 5 is a transverse sectional view taken substantially as indicated along the line 5—5 of FIG. 4.

Referring to the drawings in detail, and referring first to FIGS. 1-3, two laterally adjacent sections of modular shelving, indicated generally at 10 and 11, each include upright supporting posts, indicated at 12 and 13 for the module 10 and at 14 for one end of the module 11. As best seen in FIG. 5, each of the posts is a hollow rectangle in cross section, and the posts 13 and 14 are provided in opposite faces with respective lines of vertical slots 15 and 16. Shelves, such as the shelves 17 and 18, are hooked into the post slots at any intervals that may be required for the particular merchandise being displayed. Except for the shelving which is against a wall, the posts support shelves such as the shelves 17 and 18 on both sides; and back panels 19 and 20 of sheet material mounted between the posts of a single module provide backs for the shelves on both sides of the posts. The posts of laterally adjacent modules are in abutting relationship, as seen in FIGS. 4 and 5.

At opposite sides of the module 10 are two sets of the present apparatus, indicated generally at 21 and 22; and supported upon the sets of apparatus 21 and 22 is a point-of-purchase display device 23 of any desired type. On the post 14 of the second shelving module 11 is a third set of mounting apparatus, indicated generally at 24.

Referring particularly to FIG. 3, the apparatus 22 comprises a pair of fittings, indicated generally at 25 and 26; a bracket, indicated generally at 27; fasteners 28 and 29; and leveling means in the form of a leveling bolt 30. As seen in FIGS. 1 and 5, the sets of apparatus 21 and 24 differ from the set of apparatus 22 only in having fittings 25L and 26L which are mirror images of the fittings 25 and 26.

The fittings 25 and 26 are identical, so they will be described only with reference to the fitting 25 and the same reference numerals will be applied to the components of the two fittings. Further, the same reference numerals with the "L" suffix are applied to the components of the left hand fittings. Each fitting has a post-engaging element 31 of a shape and thickness to be inserted edgewise through a post slot 15 or 16 and occupy no more than half the width of the slot, and the element includes a neck 32 adapted to rest on the bottom 15*a* or 16*a* of a post slot 15 or 16. In the plane of the neck 32 are a lower ear 33 and an upper ear 34 to engage the interior of the post above and below a post slot in which the post-engaging element is inserted. The shape and dimensions of that part of the element 31 which defines the ears 33 and 34 are such as to permit the post-engaging element to be inserted through a slot at an angle to the horizontal and then rotated to the position seen in FIG. 6 in which the fitting sits loosely in the slot in which it is inserted.

Each fitting also includes an integral web 35 which is at right angles to the neck 32 so as to extend transversely of a post 13 in which the postengaging element 31 is inserted, and each fitting also includes a side web 36 which is perpendicular to the integral web 35, and an outer web 37 which is parallel to the web 35 so that the web 35, 36 and 37 define a laterally open channel. In the integral web 35 is a fastener hole 38 which is threaded to accommodate the threaded fastener 28 or 29, and the outer web 37 has a fastener hole 39 through which the threaded shank of the fastener passes freely.

The bracket 27 includes an upright mounting arm 40 which is a channel, and at the top of the mounting arm is an article supporting arm 41 which is also a channel and is at right angles to the mounting arm 40. In the lower portion of the mounting arm 40 is a hole 42 to receive the fastener 28, and below the hole 42 is a longitudinal slot 43 to receive the fastener 29. The mounting arm 40 must have a slot because of differences in the spacing of the longitudinal post slots in different types of modular shelving. Immediately adjacent the lower end of the mounting arm 40 are two threaded leveling bolt holes 44 and 45 which are on opposite sides of the longitudinal median plane of the mounting arm, and either of which is adapted to receive the leveling bolt 30, as is especially well illustrated in FIGS. 4 and 5.

Apparatus such as the apparatus 22 is assembled by hanging the fittings 25 and 26 into two suitably spaced post slots 15, nesting the mounting arm 40 of the bracket 27 in the channels defined by the webs 35, 36 and 37, inserting the fastener 28 through the fastener hole 39 of the fitting 25, through the hole 42 of the bracket, and screwing it into the threaded fastener hole 38 of the fitting 25. Next, the fastener 29 is extended through the fastener hole 39 of the fitting 26, through the bracket slot 43, and is screwed into the threaded fastener hole 38 of the fitting 26. In this state, the fittings 25 and 26 and the bracket arm 40 form a rigid assembly, and the post-engaging elements 31 are free to slide up and down to the limit of the post slots 16, and are also free to move in and out by a distance equal to the length of the necks 32 less the combined thickness of the post wall and the back of the mounting arm channel 40.

Figure 6:
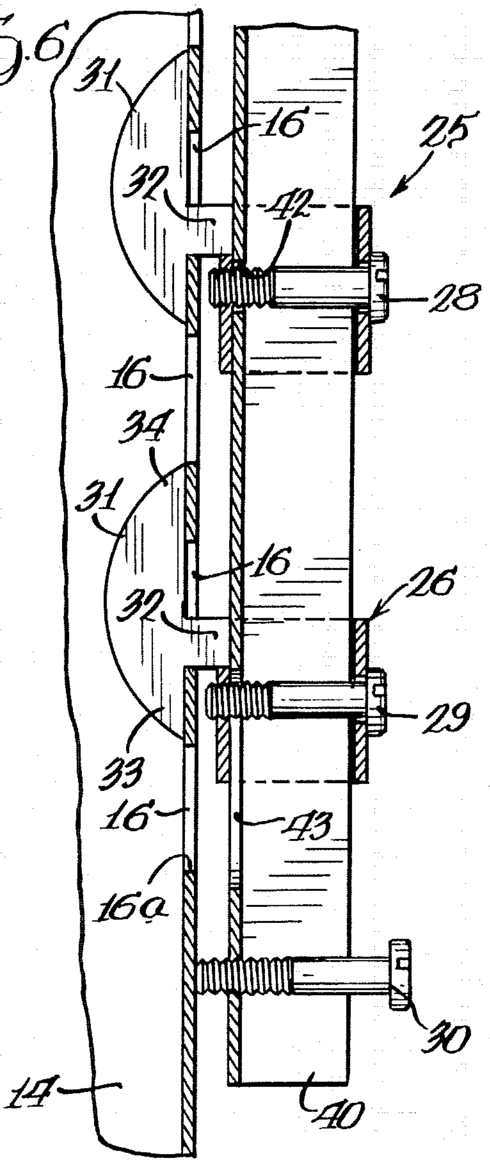
FIG. 6 is a fragmentary sectional view taken substantially as indicated along the line 6—6 of FIG. 5.

Next the leveling bolt 30 is screwed through the threaded hole 44 so that the end of its threaded shank bears upon the post 14 as seen in FIG. 6, and the leveling bolt is run in until the bracket mounting arm 40 is vertical and the bracket supporting arm 41 is horizontal. Conveniently, the upper portion of the mounting arm 40 is provided with a button 46 (FIG. 2) of a medium durometer elastomer which is compressed by rocking motion of the bracket, so that when the supporting arm 41 is level the mounting arm 40 is held firmly against the post 13.

As illustrated in FIG. 3, the bracket arm has transverse slots 47 so that threaded mounting screws 48 for the display device 23 may extend through the slots 47 and screw into threaded holes in the bottom of the display device. The reason for providing the mounting arms 41 with transverse slots 47 is that differences in the supporting posts of different makes of modular shelving may cause differences of as much as about ¾" in the space between the assemblies 21 and 22 even though both makes of shelving are 48" modules outside-to-outside of the posts 12 and 13. The reason for this problem is illustrated by a comparison of FIGS. 5 and 7, which show two different typical posts which may be found in modular shelving.

Figure 7:
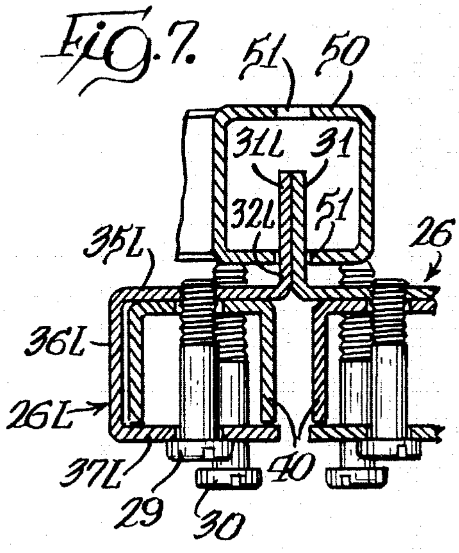
FIG. 7 is a fragmentary sectional view illustrating the apparatus mounted upon a single post that supports two modules end-to-end.

The apparatus illustrated in FIG. 7 is identical to the apparatus using the fittings 25 and 26 and 25L and 26L illustrated in FIG. 4, so the same numerals are used on those parts of the apparatus. However, in FIG. 7 a post 50 is smaller than the posts 14, and slots 51 in the post are on its longitudinal median plane instead of being offset to one side as are the slots 15 and 16 of the posts 13 and 14. As illustrated, two fittings 26 and 26L have their respective post-engaging elements 31 and 31L in a single slot 51, where they are essentially in face abutting relationship.

A very important feature of the apparatus is that the fittings 25 and 26, and the fittings 25L and 26L, are both so constructed that their respective integral webs 35 and 35L do not interfere with one another when they are inserted in coplanar slots of two hollow posts that are in laterally abutting relationship, as are the posts 13 and 14, or when they are inserted in a single slot as in FIG. 7. This permits two or more display devices like the device 23 to be mounted on adjacent shelving modules with their adjacent ends abutting, so as to provide repetitive advertising messages or a single continuous message that extends along two or more shelving modules.

The previously described arrangement for mounting a display device 23 upon the brackets 27 is only illustrative of arrangements that could be used. In practice, a display device might be provided with channels that extend inwardly from the rear, so that it could be slid over the supporting arms 41 of two mounting brackets 27. In such an arrangement, of course, it would be necessary to provide some means for locking the display device onto the supporting arms, as by removable stops across the rear ends of the channels.

It is contemplated that for lightweight display material, such as signboards, the channel-shaped fitting would be unnecessary, and fittings with only integral webs 35 or 35L would be required; and in such a case, the brackets might consist only of the upright mounting arm with an upper end portion to which the sign could be attached. However, in the case of heavy display devices, such as those having boxes for interior lighting and moving parts for shifting visual effects, the greater strength of the channel fittings and the channel bracket arms is essential.

The foregoing detailed description is given for clearness of understanding only and no unnecessary limitations should be understood therefrom, as modifications will be obvious to those skilled in the art.

We claim:

1. Apparatus for mounting a device on one of a pair of upright hollow posts which have abutting first sides and coplanar second sides, and there being a vertical line of spaced, longitudinal slots in each of said second sides with each slot in one of said lines being coplanar with a slot in the other of said lines, said apparatus comprising, in combination:

a pair of fittings each of which has a post engaging element of a shape and thickness to be inserted edgewise through a slot in a first one of said pair of posts, said element including a neck adapted to rest on the bottom of the post slot into which the element is inserted, and ears in the plane of the neck to engage the interior of the post above and below said post slot to retain an inserted fitting loosely on said first one of said pair of posts, and an integral upright web at right angles to said neck so as to extend transversely across and parallel to the second side of said first one of said pair of posts, said web being devoid of means which would interfere with a separate fitting inserted in the coplanar slot of a second one of said pair of posts, and said web having a fastener hole to receive a fastener;

a bracket comprising an upright mounting arm, said mounting arm having a hole adapted to receive a fastener which also extends into a fastener hole of the web of one of the pair of fittings, and also having a longitudinal slot to receive a fastener which extends into the fastener hole of the web of the other of the pair of fittings, whereby two fittings may be pre-engaged in an upper post slot and a lower post slot and said bracket may be fixedly secured thereto by two fasteners;

and leveling means adapted to engage the bracket mounting arm and the post for placing the mounting arm in plumb and holding it firmly against the post.

2. The combination of claim 1 in which the fittings include a side web perpendicular to the integral web and an outer web parallel to the integral web so as to define a laterally open channel, said outer web has a fastener hole aligned with the fastener hole in the integral web, and the bracket mounting arm nests in said laterally open channels.

3. The combination of claim 2 in which the bracket mounting arm is a channel and there is a channel-shaped article supporting arm at the top of said mounting arm and at right angles thereto.

4. The combination of each one of the preceding claims in which the fastener holes in the integral webs of the fittings are threaded, and the fasteners are threaded to screw into said fastener holes.

5. The combination of claim 4 in which the bracket mounting arm has a threaded leveling bolt hole near its lower end, and the leveling means comprises a threaded bolt adapted to be screwed through said threaded leveling bolt hole and bear upon the post.

6. The combination of claim 5 in which there are two leveling bolt holes on opposite sides of the longitudinal median plane of the bracket mounting arm.

7. A fitting of which a pair may be used to mount a device supporting bracket on one of a pair of upright hollow posts which have abutting first sides and coplanar second sides, and there being a vertical line of spaced, longitudinal slots in each of said second sides with each slot in one of said lines being coplanar with a slot in the other of said lines, said fitting comprising:

a post engaging element of a shape and thickness to be inserted edgewise through a slot in a first one of said pair of posts, said element including a neck adapted to rest on the bottom of the post slot into which the element is inserted, and ears in the plane of the neck to engage the interior of the post above and below said post slot to retain an inserted fitting loosely on the post, and an integral upright web at right angles to said neck so as to extend transversely across and parallel to the second side of said first one of said pair of posts, said web being devoid of means which would interfere with a separate fitting inserted in the coplanar slot of a second one of said pair of posts, a side web perpendicular to the integral web and an outer web parallel to the integral web so as to define a laterally open channel, and said integral web and said outer web having fastener holes aligned with one another to receive a fastener for securing in said laterally open channel a mounting arm of a device supporting bracket that is provided with means which engages said second side of the post to lock the inserted fitting to the post.

* * * * *